US012337593B2

(12) United States Patent
Yashiro et al.

(10) Patent No.: US 12,337,593 B2
(45) Date of Patent: Jun. 24, 2025

(54) TRANSPORT DEVICE AND LIQUID EJECTING DEVICE

(71) Applicant: SEIKO EPSON CORPORATION, Tokyo (JP)

(72) Inventors: Hirotaka Yashiro, Matsumoto (JP); Ryosuke Ban, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 18/061,818

(22) Filed: Dec. 5, 2022

(65) Prior Publication Data

US 2023/0173831 A1 Jun. 8, 2023

(30) Foreign Application Priority Data

Dec. 7, 2021 (JP) ................................ 2021-198290

(51) Int. Cl.
*B41J 15/04* (2006.01)
*B65H 23/26* (2006.01)

(52) U.S. Cl.
CPC .............. *B41J 15/04* (2013.01); *B65H 23/26* (2013.01); *B65H 2402/31* (2013.01); *B65H 2407/21* (2013.01)

(58) Field of Classification Search
CPC . B41J 15/046; B41J 15/048; B41J 2/01; B41J 15/16; B41J 15/165; B41J 15/042; B41J 15/005; B41J 15/04; B65H 1/04; B65H 29/20; B65H 23/025; B65H 23/10; B65H 23/105; B65H 23/14; B65H 23/00; B65H 23/04; B65H 23/26; B65H 23/16; B65H 23/06; B65H 23/048; B65H 23/028; B65H 20/00; B65H 20/005; D06B 23/02; D06B 23/021; D06B 23/023
See application file for complete search history.

(56) References Cited

U.S. PATENT DOCUMENTS

| | | | | |
|---|---|---|---|---|
| 7,036,923 B2 * | 5/2006 | Takagi | B41J 15/048 | 400/621 |
| 7,673,983 B2 | 3/2010 | Coenen | | |
| 8,469,355 B2 * | 6/2013 | Miwa | B65H 1/04 | 271/167 |
| 8,508,820 B2 * | 8/2013 | Honma | B65H 29/20 | 358/496 |
| 2006/0050128 A1 * | 3/2006 | Coenen | B41J 15/005 | 347/104 |
| 2012/0200639 A1 | 8/2012 | Takada | | |

(Continued)

FOREIGN PATENT DOCUMENTS

| | | |
|---|---|---|
| EP | 3263496 | 7/2019 |
| JP | H10-195784 A | 7/1998 |

(Continued)

*Primary Examiner* — Leslie J Evanisko
*Assistant Examiner* — Thomas Ray Knief
(74) *Attorney, Agent, or Firm* — WORKMAN NYDEGGER

(57) ABSTRACT

A transport device includes a roller unit having a first roller, a second roller, and a third roller among which a medium supplied from a holding unit holding the medium is wound, a transport unit configured to transport the medium passing through the roller unit, and a support portion movably supporting the roller unit with respect to the transport unit.

5 Claims, 11 Drawing Sheets

(56) References Cited

U.S. PATENT DOCUMENTS

| | | | | |
|---|---|---|---|---|
| 2016/0107461 | A1* | 4/2016 | Takizawa .......... | B65H 23/1825 226/38 |
| 2021/0107296 | A1 | 4/2021 | Kaneko et al. | |
| 2021/0197598 | A1 | 7/2021 | Washio et al. | |

FOREIGN PATENT DOCUMENTS

| | | | | |
|---|---|---|---|---|
| JP | 2002-249976 | A | | 9/2002 |
| JP | 2004142418 | A | * | 5/2004 |
| JP | 2006-076296 | | | 3/2006 |
| JP | 2012-161764 | | | 8/2012 |
| JP | 2017-094233 | | | 6/2017 |
| JP | 2021-62484 | A | | 4/2021 |
| JP | 2021-104633 | A | | 7/2021 |

* cited by examiner

TRANSPORT DEVICE AND LIQUID EJECTING DEVICE

The present application is based on, and claims priority from JP Application Serial Number 2021-198290, filed Dec. 7, 2021, the disclosure of which is hereby incorporated by reference herein in its entirety.

BACKGROUND

1. Technical Field

The present disclosure relates to a transport device and a liquid ejecting device.

2. Related Art

For example, as described in JP-A-2021-104633, there is a recording device that is an example of a liquid ejecting device, the recording device records by ejecting a liquid from a recording head that is an example of an ejecting unit. The recording device includes a holding unit, a wrinkle suppression device that is an example of a roller unit, and a transporting unit that is an example of a transport unit. The holding unit holds a roll body that is a long wound-up medium. The wrinkle suppression device includes a plurality of rollers. The wrinkle suppression device suppresses the increase of wrinkles in the medium by applying tension to the medium wound around the plurality of rollers.

When installing a medium in the recording device of JP-A-2021-104633, the operator winds the medium on the plurality of rollers and keeps the medium at the transport unit. However, no consideration is given to the workability during the installation of the medium.

SUMMARY

A transport device that solves the problem described above includes a roller unit having a plurality of rollers around which a medium supplied from a holding unit holding the medium is wound, a transport unit configured to transport the medium passing through the roller unit, and a support portion movably supporting the roller unit relative to the transport unit.

A liquid ejecting device that solves the problem described above includes an ejecting unit configured to eject a liquid onto a medium, a roller unit having a plurality of rollers around which the medium supplied from a holding unit holding the medium is wound, a transport unit configured to transport the medium passing through the roller unit, and a support portion movably supporting the roller unit relative to the transport unit.

DESCRIPTION OF EXEMPLARY EMBODIMENTS

Embodiments

Figure 1:
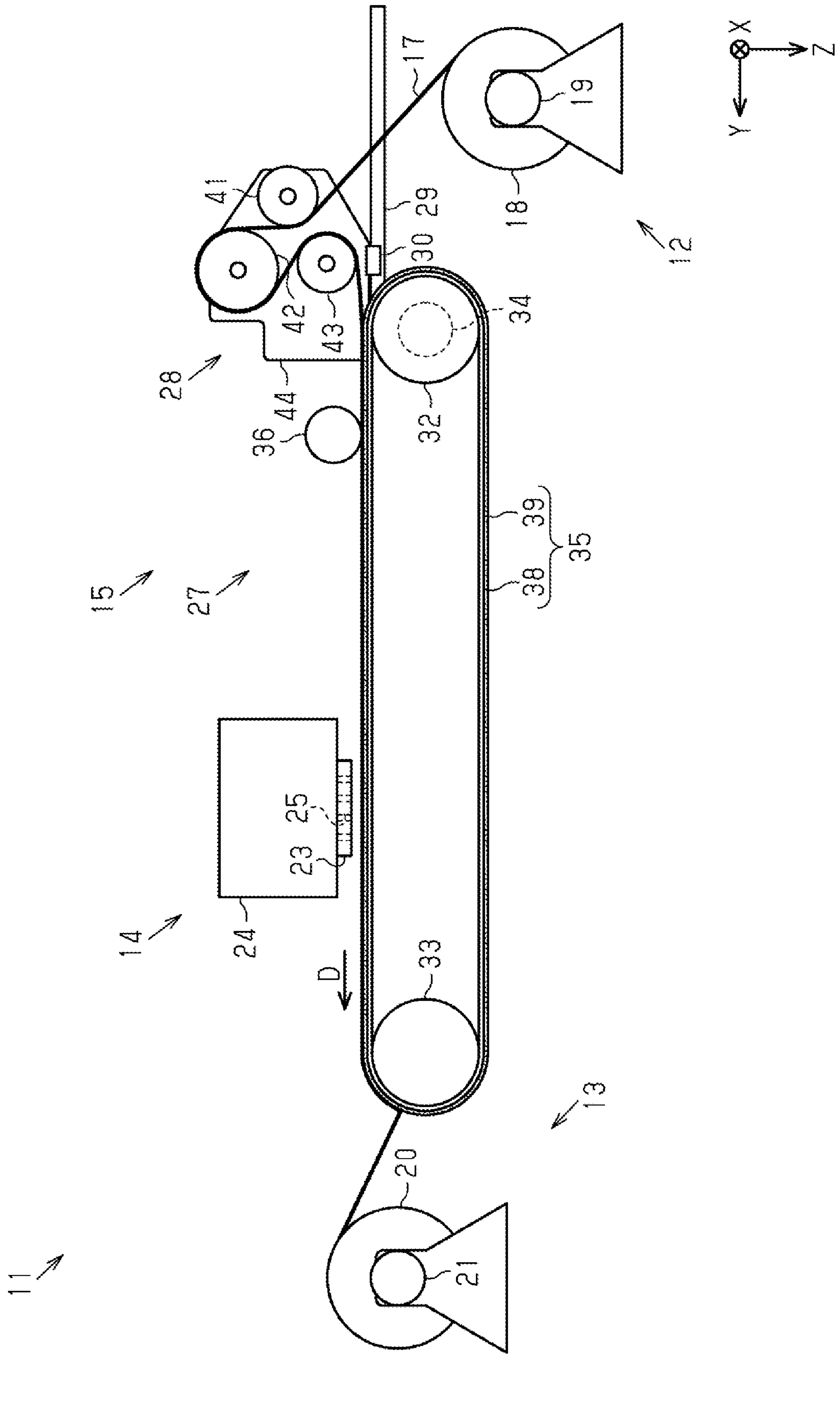
FIG. 1 is a schematic diagram of an embodiment of a liquid ejecting device.

An embodiment of a transport device and a liquid ejecting device will be described below with reference to the drawings. The liquid ejecting device is, for example, an ink jet-type printer that records an image such as texts and photographs on a medium such as paper or fabric by ejecting an ink, which is an example of a liquid.

In the drawings, the gravitational direction is indicated by the Z-axis, and the directions along a horizontal plane are indicated by the X-axis and the Y-axis, assuming that a liquid ejecting device 11 is placed on the horizontal plane. The X-axis, the Y-axis, and the Z-axis are orthogonal to each other. In the following description, a direction parallel to the X-axis is also referred to as a width direction X, a direction parallel to the Y-axis is also referred to as a moving direction Y, and a direction parallel to the Z-axis is also referred to as a vertical direction Z.

Liquid Ejecting Device

As illustrated in FIG. 1, the liquid ejecting device 11 may include a holding unit 12, a winding unit 13, a recording unit 14, and a transport device 15.

The holding unit 12 holds a medium 17. The holding unit 12 is configured to hold a first roll body 18 obtained by winding the medium 17, which is long, into a roll. The first roll body 18 is the medium 17 before recording.

The holding unit 12 may include a feeding motor 19. The feeding motor 19 rotates the first roll body 18 by rotating a shaft that is not illustrated. The holding unit 12 supplies the medium 17 released from the first roll body 18 to the transport device 15 by rotating the first roll body 18 as the transport device 15 transports the medium 17. In the present embodiment, the direction in which the medium 17 is transported is also referred to as a transport direction D.

The transport direction D is a direction from the holding unit 12 toward the winding unit 13, and is a direction along the transport path of the medium 17. The holding unit 12 is positioned at the upstream end in the transport direction D. The transport device 15 sends the medium 17 pulled out from the holding unit 12 to the winding unit 13 that is at the downstream end in the transport direction D.

The winding unit 13 winds the medium 17 to form a second roll body 20. The winding unit 13 is configured to hold the second roll body 20. The winding unit 13 may include a winding motor 21. The winding motor 21 winds the medium 17 after recording by rotating a shaft that is not illustrated.

The recording unit 14 includes an ejecting unit 23 and a carriage 24.

The ejecting unit 23 includes a nozzle 25. The ejecting unit 23 is configured to eject a liquid onto the medium 17. The ejecting unit 23 ejects a liquid from the nozzle 25 and makes a record on the medium 17.

The carriage 24 holds the ejecting unit 23. The carriage 24 of the present embodiment allows the ejecting unit 23 to reciprocate along the X-axis. The ejecting unit 23 of the present embodiment is of a serial type that ejects a liquid while moving. The ejecting unit 23 may be of a line type provided across the width direction X of the medium 17.

Transport Device

The transport device 15 includes a transport unit 27, a roller unit 28, and a support portion 29. The transport device 15 may include a speed limiting mechanism 30.

The transport unit 27 is provided downstream of the roller unit 28 in the transport direction D. The transport unit 27 is configured to transport the medium 17 passing through the roller unit 28. The transport unit 27 transports the medium 17 in the transport direction D.

The transport unit 27 may include a driving roller 32, a driven roller 33, a driving unit 34, a transporting belt 35, and a pressing portion 36.

The driving unit 34 transmits a driving force to the driving roller 32 and drives the transporting belt 35. The driving unit 34 is, for example, a motor. The driving unit 34 rotates the driving roller 32. When the driving roller 32 rotates, the transporting belt 35 revolves around the driving roller 32 and the driven roller 33. The driven roller 33 is driven to rotate as the transporting belt 35 rotates.

The transporting belt 35 includes a base material 38 and an adhesive layer 39 having adhesiveness. The transporting belt 35 forms a ring shape. The inner circumferential surface of the transporting belt 35 is composed of the base material 38. The inner circumferential surface is in contact with the driving roller 32 and the driven roller 33. The outer circumferential surface of the transporting belt 35 is composed of the adhesive layer 39. The adhesive layer 39 may be formed of an adhesive applied to the base material 38.

The medium 17 can be adhered to the outer circumferential surface of the transporting belt 35. The transporting belt 35 transports the medium 17 in the transport direction D by revolving around with the medium 17 adhered to the transporting belt 35. The transported medium 17 is peeled off from the transporting belt 35 by the winding unit 13.

The pressing portion 36 is provided outside the transporting belt 35. The pressing portion 36 presses the medium 17 onto the transporting belt 35. That is, the pressing portion 36 adheres the medium 17 to the transporting belt 35. As the transporting belt 35 revolves, the pressing portion 36 adheres the medium 17 on the transporting belt 35 in the order that the medium 17 is supplied to the pressing portion 36. The pressing portion 36 may be, for example, a rod, or may be a roller, or may be an air blowing unit that presses the medium 17 with air pressure.

The roller unit 28 is positioned between the holding unit 12 and the transport unit 27 in the transport direction D. The roller unit 28 imparts tension to the medium 17 to reduce wrinkles on the medium 17.

Figure 2:
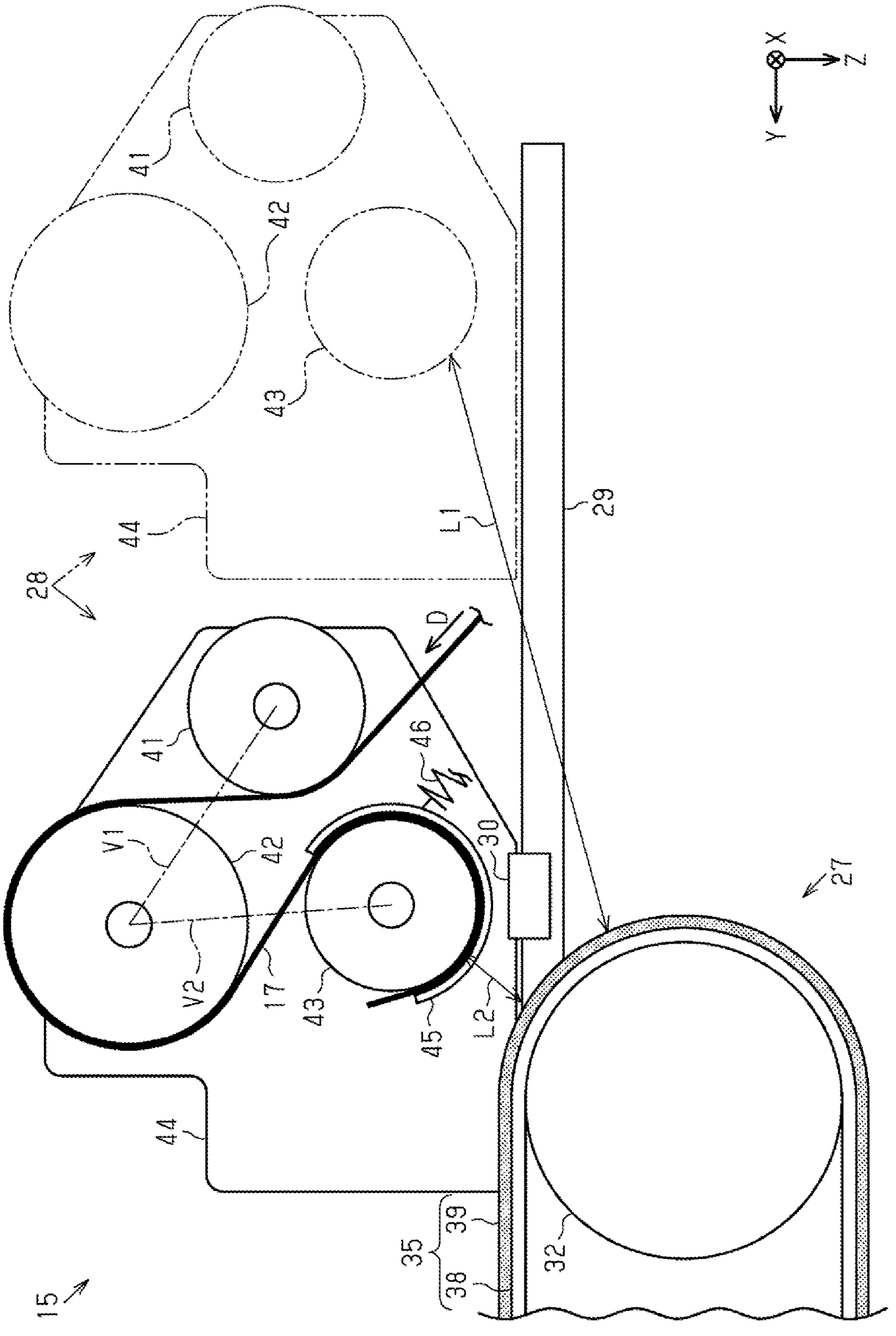
FIG. 2 is a schematic diagram of a transport device.

As illustrated in FIG. 2, the roller unit 28 includes a first roller 41, a second roller 42, and a third roller 43. The roller unit 28 may include a support wall 44, a retaining portion 45, and an anchoring portion 46. The roller unit 28 may include a spring, which is not illustrated, that pushes the second roller 42 away from the first roller 41 and the third roller 43.

In the present embodiment, the first roller 41, the second roller 42, and the third roller 43 are also simply referred to as rollers without distinction. The number of rollers included in the roller unit 28 may be two, or may be four or more. That is, the roller unit 28 includes a plurality of rollers.

The support wall 44 rotatably supports each of the first roller 41, the second roller 42, and the third roller 43. The roller unit 28 may have a plurality of support walls 44. The roller unit 28 of the present embodiment includes a pair of support walls 44 that are provided apart from each other in the width direction X. The pair of support walls 44 may support both ends of each of the rollers. The pair of support walls 44 may support each of the rollers in a manner that the axial direction of each of the rollers is parallel to the X-axis.

The medium 17 supplied from the holding unit 12 is wound among the first roller 41, the second roller 42, and the third roller 43 in this order. That is, the first roller 41, the second roller 42, and the third roller 43 are provided along the transport direction D. The portions of the first roller 41, the second roller 42, and the third roller 43 that are in contact with the medium 17 form the transport path of the medium 17. The first roller 41, the second roller 42, and the third roller 43 may be driven to rotate as the medium 17 is being transported.

The first roller 41 is positioned upstream of the second roller 42 in the transport direction D. The second roller 42 is positioned between the first roller 41 and the third roller 43 in the transport direction D. The third roller 43 is positioned downstream of the second roller 42 in the transport direction D. The first roller 41 and the third roller 43 may be positioned below the second roller 42 in the vertical direction Z.

In the present embodiment, an imaginary line connecting the center of rotation of the first roller 41 and the center of rotation of the second roller 42 is referred to as a first imaginary line V1. In the present embodiment, an imaginary line connecting the center of rotation of the second roller 42 and the center of rotation of the third roller 43 is referred to as a second imaginary line V2. The first imaginary line V1 and the second imaginary line V2 are perpendicular to the X-axis. The first roller 41, the second roller 42, and the third roller 43 may be disposed in a manner that the angle formed by the first imaginary line V1 and the second imaginary line V2 is an acute angle. By being wound on the second roller 42 while passing between the first roller 41 and the third roller 43, the medium 17 can be brought into contact with the half or more of the circumference of the second roller 42.

The coefficient of friction of the circumferential surface of the second roller 42 may be greater than that of the circumferential surface of the first roller 41 and that of the circumferential surface of the third roller 43. By relatively increasing the coefficient of friction of the second roller 42, the medium 17 wound on the second roller 42 can be prevented from sliding in the width direction X.

The retaining portion 45 is configured to retain the medium 17 wound on the third roller 43 positioned most downstream in the transport direction D among the plurality of rollers. The retaining portion 45 is detachable from the third roller 43. The roller unit 28 may include one retaining portion 45 or a plurality of retaining portions 45. The plurality of retaining portions 45 may be installed on the third roller 43 at intervals in the width direction X. The operator may change the number of the retaining portions 45 to be used according to the size of the medium 17 in the width direction X.

The retaining section 45 restricts movement of the medium 17 relative to the third roller 43 by sandwiching the medium 17 between the third roller 43 and the retaining section 45. The retaining section 45 is, for example, a clip having elasticity configured to press the medium 17 onto the third roller 43.

The anchoring portion 46 may connect the retaining portion 45 and, for example, the support wall 44. By providing the anchoring portion 46, the operator can easily store the retaining section 45. The anchoring portion 46 may have elasticity. The anchoring portion 46 may be detachable from at least either the retaining portion 45 or the support wall 44.

The support portion 29 movably supports the roller unit 28. The roller unit 28 is movable relative to the transport unit 27. The support portion 29 is, for example, a linear guide. The support portion 29 may slidably support the roller unit 28 along the Y-axis. The support portion 29 is fixed to, for example, a frame, which is not illustrated, of the transport unit 27, the frame supporting the driving roller 32 and the driven roller 33.

The roller unit 28 is configured to move, along the support portion 29, to a recording position indicated by a solid line in FIG. 2 and a set position indicated by a dash-double-dotted line in FIG. 2. The roller unit 28 in the set position moves to the recording position by moving in the moving direction Y. The roller unit 28 moves away from the transport unit 27 by moving from the recording position to the set position. Specifically, a first distance L1 between the third roller 43 and the transport unit 27 when the roller unit 28 is in the set position is greater than a second distance L2 between the third roller 43 and the transport unit 27 when the roller unit 28 is in the recording position. The first distance L1 and the second distance L2 are the shortest distances between the third roller 43 and the transport unit 27.

The speed limiting mechanism 30 limits a moving speed of the roller unit 28 moving relative to the transport unit 27. The speed limiting mechanism 30 may utilize the force of a magnet to limit the moving speed. The speed limiting mechanism 30 may limit the moving speed in the entire region where the roller unit 28 is movable. The speed limiting mechanism 30 may limit the moving speed in a part of the region where the roller unit 28 is movable. The speed limiting mechanism 30 may reduce the moving speed of the roller unit 28 immediately before the roller unit 28 in movement reaches the recording position or the set position.

Effects of Embodiment

Next, actions of the present embodiment will be described.

As illustrated in FIG. 2, when installing the medium 17 in the liquid ejecting device 11, the operator places the roller unit 28 at the set position. While passing the medium 17 pulled out from the first roll body 18 between the first roller 41 and the third roller 43, the operator winds the medium 17 around the second roller 42.

With the medium 17 wound around the first roller 41, the second roller 42, and the third roller 43, the operator installs the retaining portion 45 on the third roller 43. That is, the retaining portion 45 presses the medium 17 onto the third roller 43. The operator moves the roller unit 28 from the set position to the recording position with the retaining portion 45 installed. While the roller unit 28 is in the recording position, the operator removes the retaining portion 45, pulls the medium 17 out, and installs the medium 17 on the transport unit 27 and the winding unit 13.

Effects of Exemplary Embodiment

Effects of the present embodiment will now be described.

(1) The roller unit 28 is movable relative to the transport unit 27. As such, the distance between the roller unit 28 and the transport unit 27 can be changed. Thus, for example, the operator can install the medium 17 while positioning the roller unit 28 away from the transport unit 27, making it possible to improve the workability of installing the medium 17.

(2) When the roller unit 28 moves with the medium 17 wound on a plurality of rollers, the medium 17 may be pulled off from the roller unit 28. The pulling-off of the medium 17 is caused by tension exerted on the medium 17 between the holding unit 12 and the roller unit 28. In a case in which the medium 17 is pulled off, it is necessary to move the roller unit 28 and then repeat the operation of winding the medium 17 on the plurality of rollers. As such, workability of installing the medium 17 in the roller unit 28 is reduced. In this regard, the retaining portion 45 is configured to retain the medium 17 wound on the third roller 43 positioned most downstream in the transport direction D. Thus, when the roller unit 28 moves, the risk that the medium 17 is pulled off from the roller unit 28 can be reduced.

(3) The speed limiting mechanism 30 limits the moving speed of the roller unit 28. Thus, it is possible to reduce the risk of the roller unit 28 moving at a moving speed unintended by the operator.

MODIFIED EXAMPLES

The present embodiment described above may be modified as follows. The present embodiment and modified examples thereof to be described below may be implemented in combination within a range in which a technical contradiction does not arise.

First Variation

Figure 3:
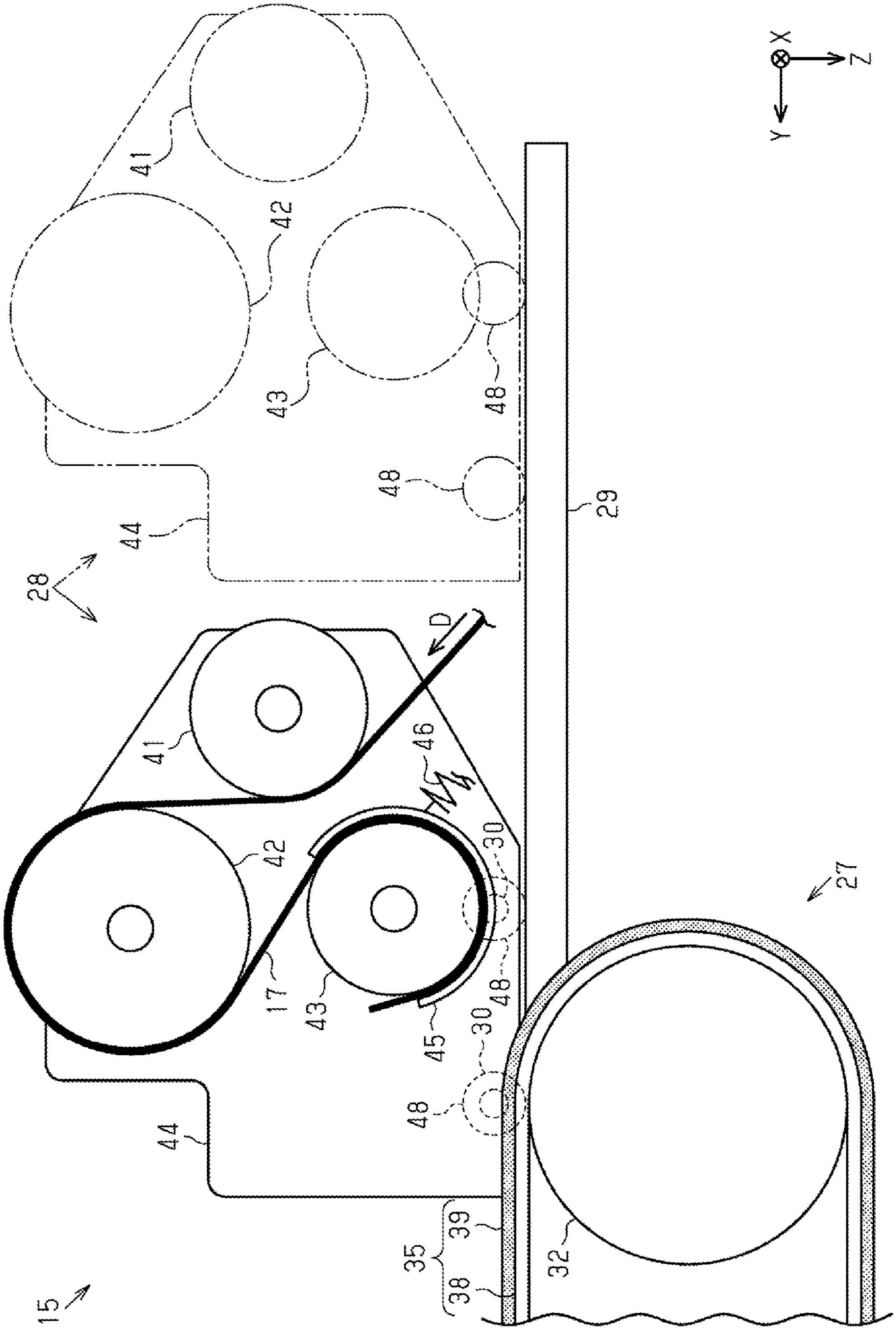
FIG. 3 is a schematic diagram of a first variation of the transport device.

As illustrated in FIG. 3, the roller unit 28 may have a plurality of wheels 48. The support portion 29 may be a rail that guides the plurality of wheels 48. The rail may be provided in a pair, the pair of rails spaced apart from each other in the width direction X. The rail may have a rectangular cross-section, for example, a polygonal cross-section such as a hexagonal cross-section. The rail may support the wheels 48 in the vertical direction Z and the width direction X by a planar upper surface and a planar side surface. The rail may have a semi-circular cross-section, or may have a circular cross-section. The rail may support the wheels 48 on a curved surface. The speed limiting mechanism 30 may be provided on at least one wheel 48. Note that while the roller unit 28 includes the rail, the support portion 29 may include the plurality of wheels 48. That is, while the roller unit 28 has the rail, the plurality of wheels 48 may be provided on the frame of the transport unit 27.

Second Variation

Figure 4:
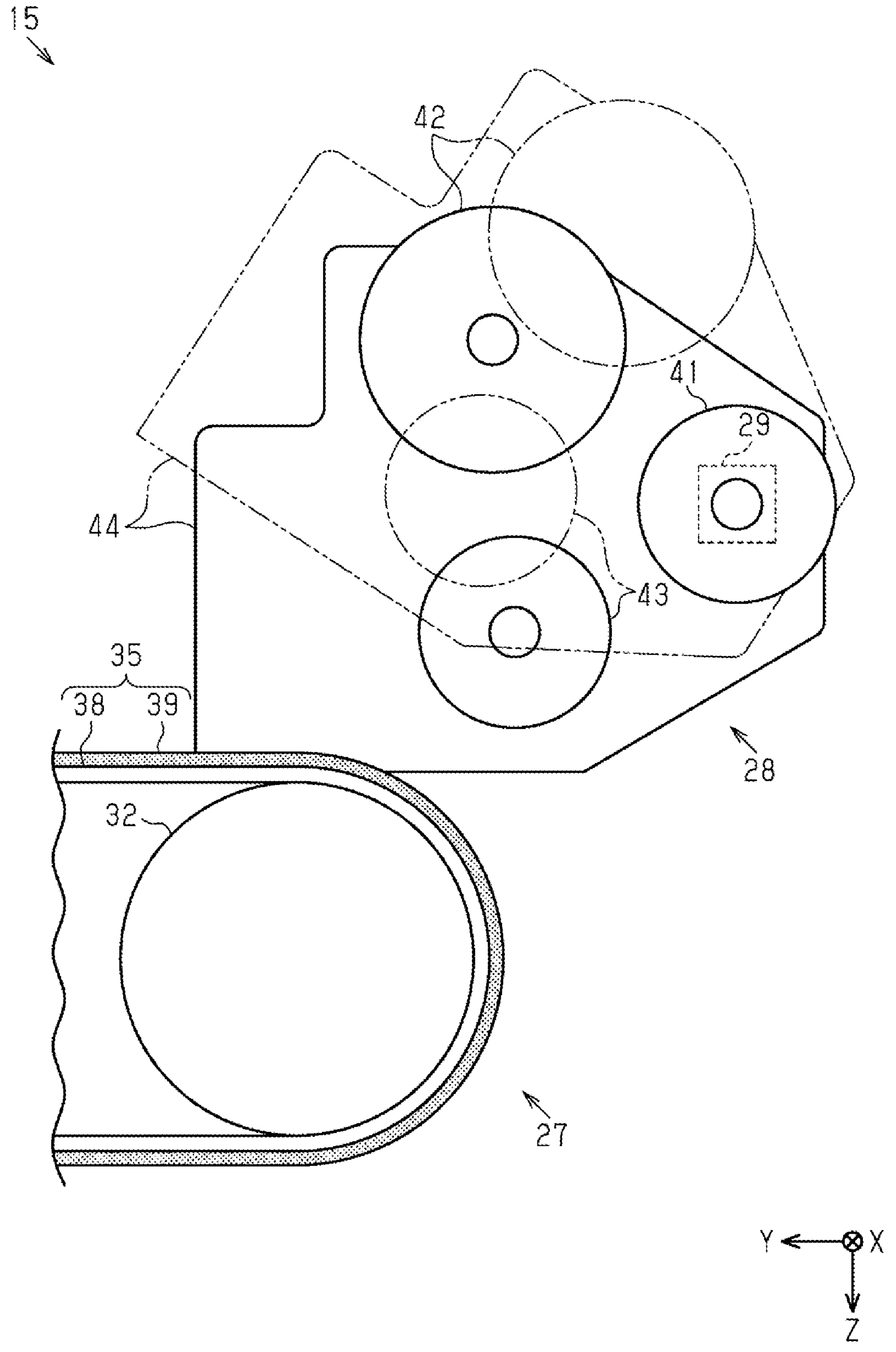
FIG. 4 is a schematic diagram of a second variation of the transport device.

As illustrated in FIG. 4, the support portion 29 may rotatably support the roller unit 28. That is, the roller unit 28 may move relative to the transport unit 27 by rotating. The roller unit 28 may be rotatable about the shaft of the first roller 41, for example. In this case, the roller unit 28 may rotate to move the second roller 42, the third roller 43, and the support wall 44 into a recording position indicated by a solid line in FIG. 4 or into a set position indicated by a dash-double-dotted line in FIG. 4.

Third Variation

Figure 5:
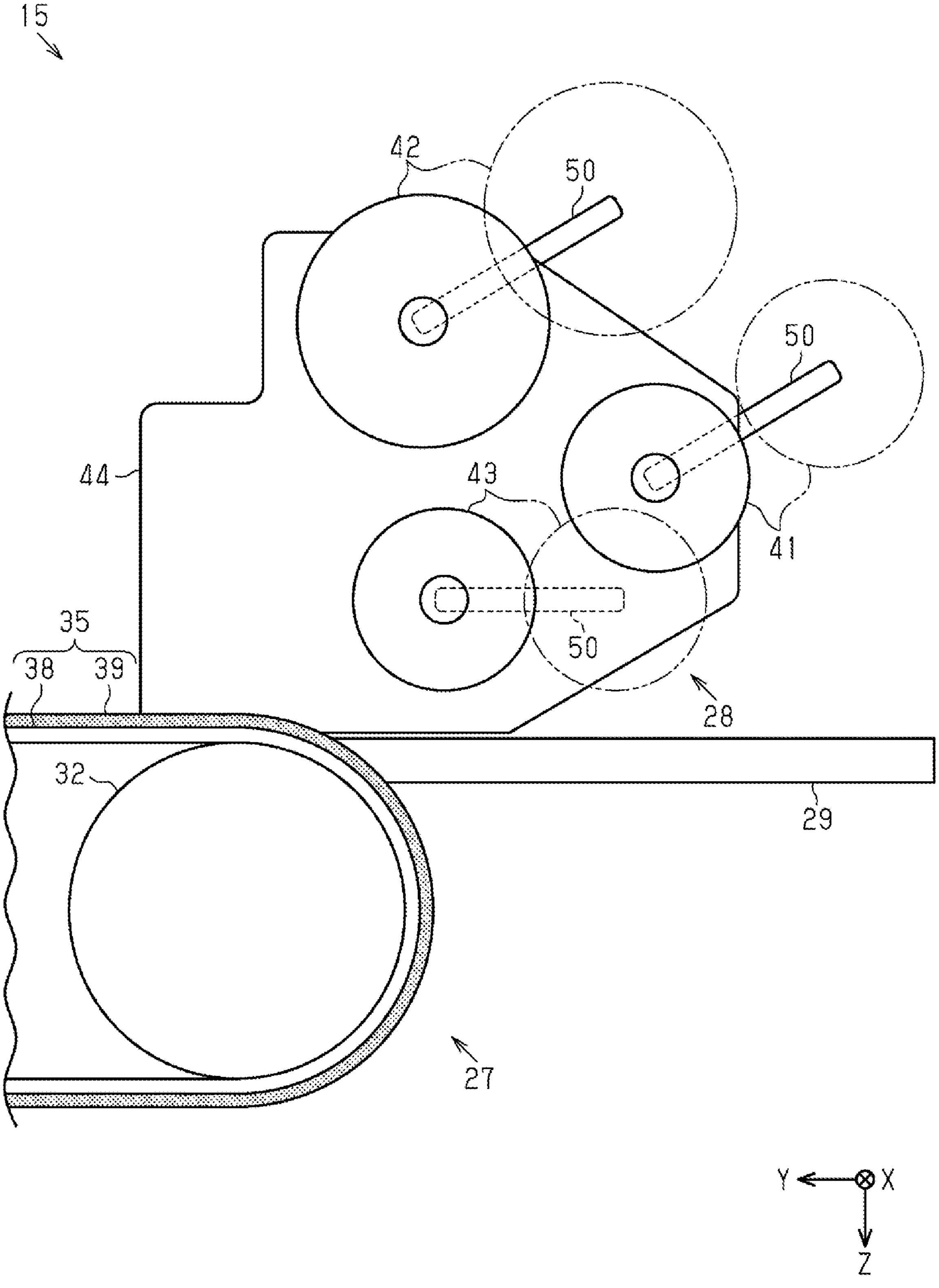
FIG. 5 is a schematic diagram of a third variation of the transport device.

As illustrated in FIG. 5, an arm 50 for moving at least one roller among the first roller 41, the second roller 42, and the third roller 43 may be further provided. The arm 50 may be a linear guide, or may be a rail. The transport device 15 may include a plurality of arms 50. In the present variation, the arm 50 is provided in the same number as that of the rollers. Each of the first roller 41, the second roller 42, and the third roller 43 may slide into a recording position indicated by a solid line in FIG. 5 or a set position indicated by a dash-double-dotted line in FIG. 5. The first roller 41, the second roller 42, and the third roller 43 may be individually movable.

Fourth Variation

Figure 6:
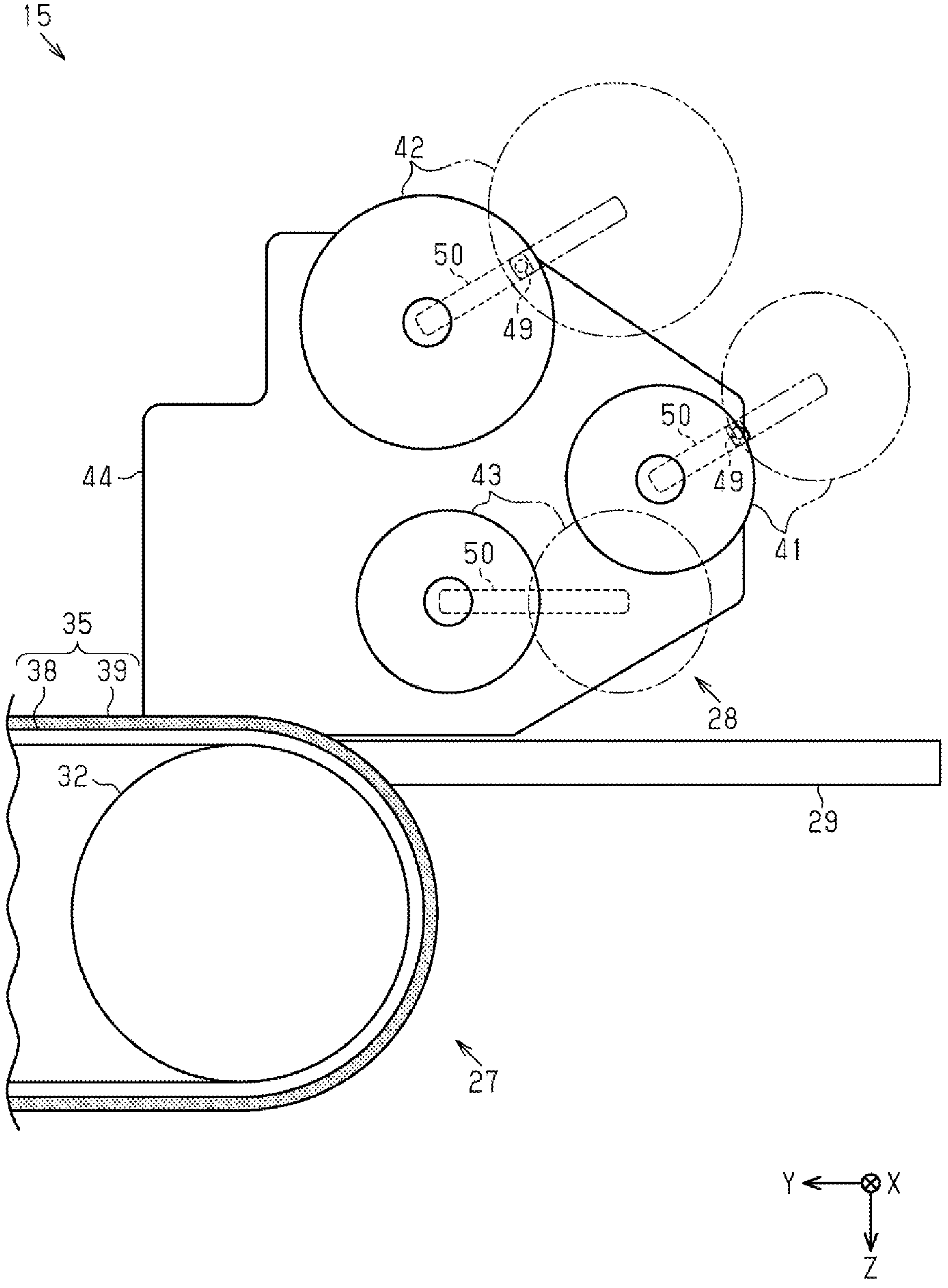
FIG. 6 is a schematic diagram of a fourth variation of the transport device.

As illustrated in FIG. 6, the arm 50 may be rotatable about a rotary shaft 49. The arm 50 may allow at least one roller among the first roller 41, the second roller 42, and the third roller 43 to rotate. For example, the arm 50 supporting the first roller 41 may allow the first roller 41 to rotate. For example, the arm 50 supporting the second roller 42 may allow the second roller 42 to rotate. The arm 50 supporting the third roller 43 may allow the third roller 43 to slide. Each of the first roller 41, the second roller 42, and the third roller 43 may move into a recording position indicated by a solid line in FIG. 6 or a set position indicated by a dash-double-dotted line in FIG. 6.

Fifth Variation

Figure 7:
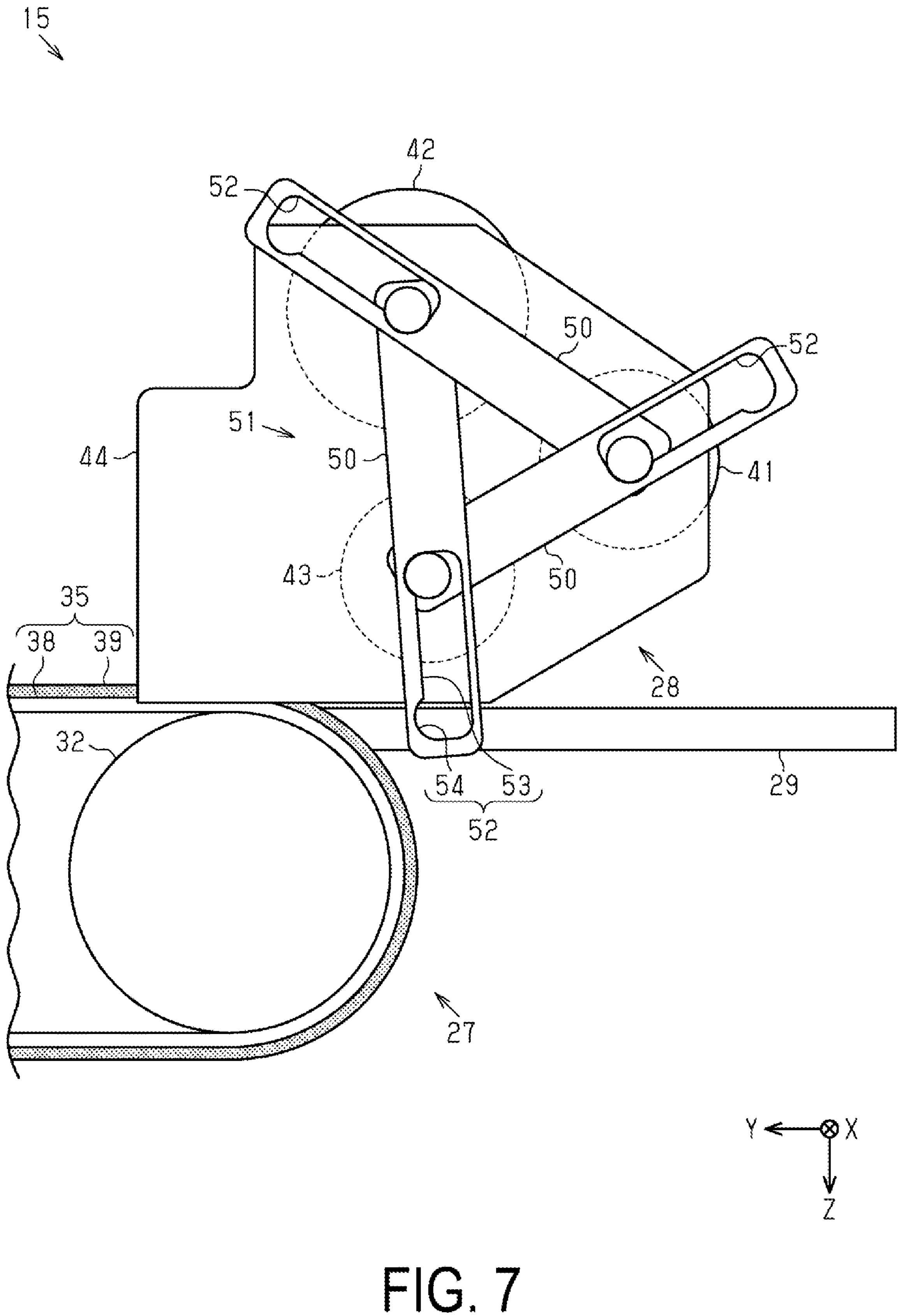
FIG. 7 is a schematic diagram of a fifth variation of the transport device.
Figure 8:
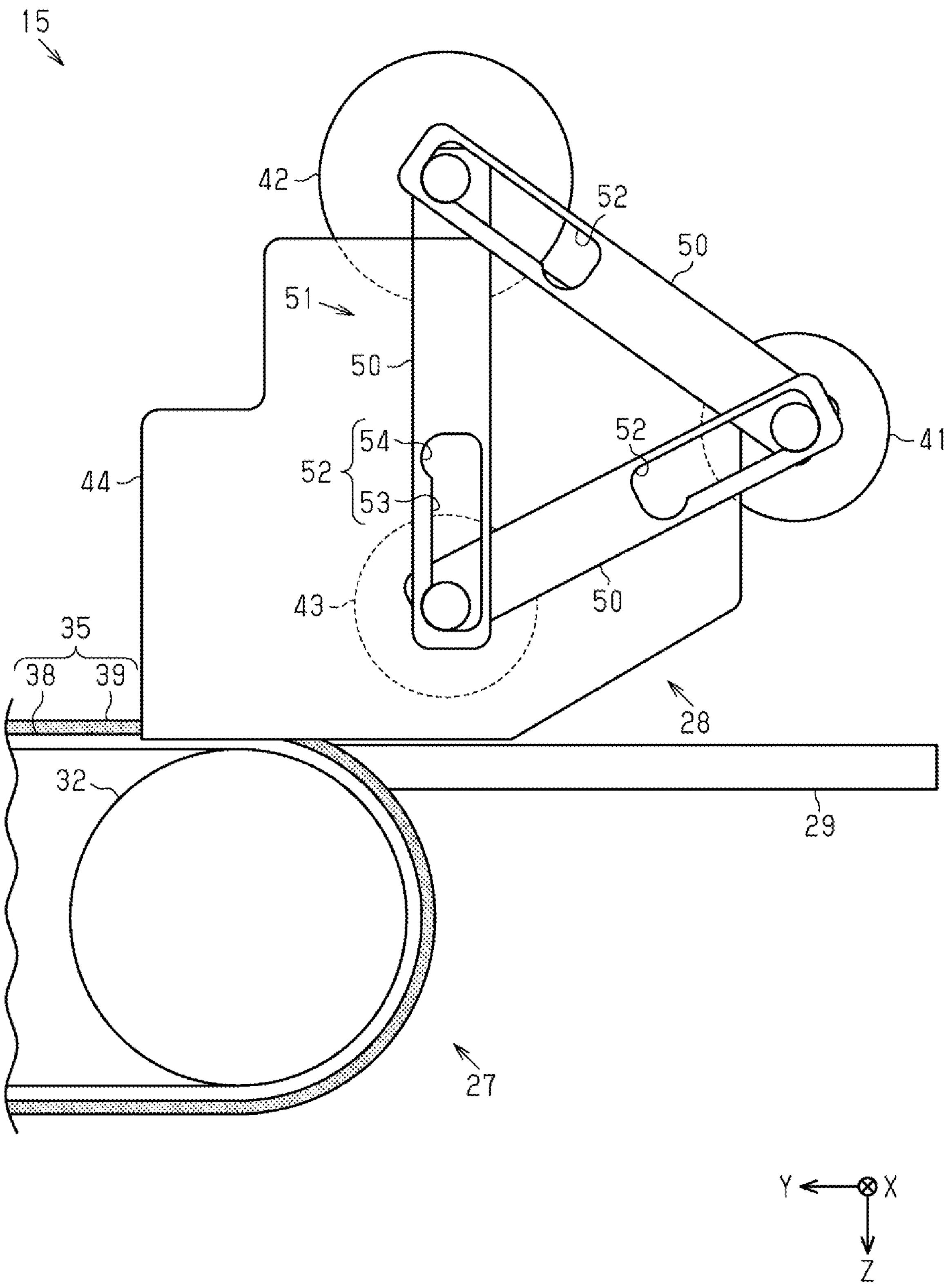
FIG. 8 is a schematic diagram of the fifth variation of the transport device.

As illustrated in FIGS. 7 and 8, the arm 50 may support a shaft of a corresponding roller. The roller unit 28 may include an interlocking mechanism 51 and a switching mechanism 52. The interlocking mechanism 51 interlocks the plurality of rollers with each other and changes the positions of the plurality of rollers. Thus, it is more convenient for the operator compared to a case in which the operator changes the positions of the plurality of rollers individually. In the present variation, the interlocking mechanism 51 is composed of the same number of arms 50 as that of the rollers.

The switching mechanism 52 of the present variation is a hole formed in each of the arms 50. In the present variation, the first roller 41 and the second roller 42 move relative to the third roller 43. Specifically, when the first roller 41 or the second roller 42 in the recording position illustrated in FIG. 7 are moved, the first roller 41 and the second roller 42 move to the set position illustrated in FIG. 8.

The switching mechanism 52 switches between a first state in which position change of at least one of the plurality of rollers is allowed and a second state in which position change of the roller is restricted. The switching mechanism 52 may include a guide hole 53 and a holding hole 54. The holding hole 54 may be provided on both ends of the guide hole 53, or may be provided on either end of the guide hole 53. The guide hole 53 allows position change of a roller by guiding the shaft of the roller. The holding hole 54 restricts position change of a roller by restricting the movement of the shaft of the roller. The holding hole 54 may be recessed downward in the vertical direction Z from the guide hole 53.

As illustrated in FIGS. 7 and 8, when the first roller 41, the second roller 42, and the third roller 43 are in the recording position or in the set position, each of the rollers is in the second state in which the shaft is in the holding hole 54. In a case in which the first roller 41, the second roller 42, and the third roller 43 are in a position that is neither the recording position nor the set position, each of the rollers is in the first state in which the shaft is in the guide hole 53. In the first state, positions of the rollers can be easily changed. In the second state, the medium 17 can be easily wound on a roller that is restricted from position change.

Sixth Variation

Figure 9:
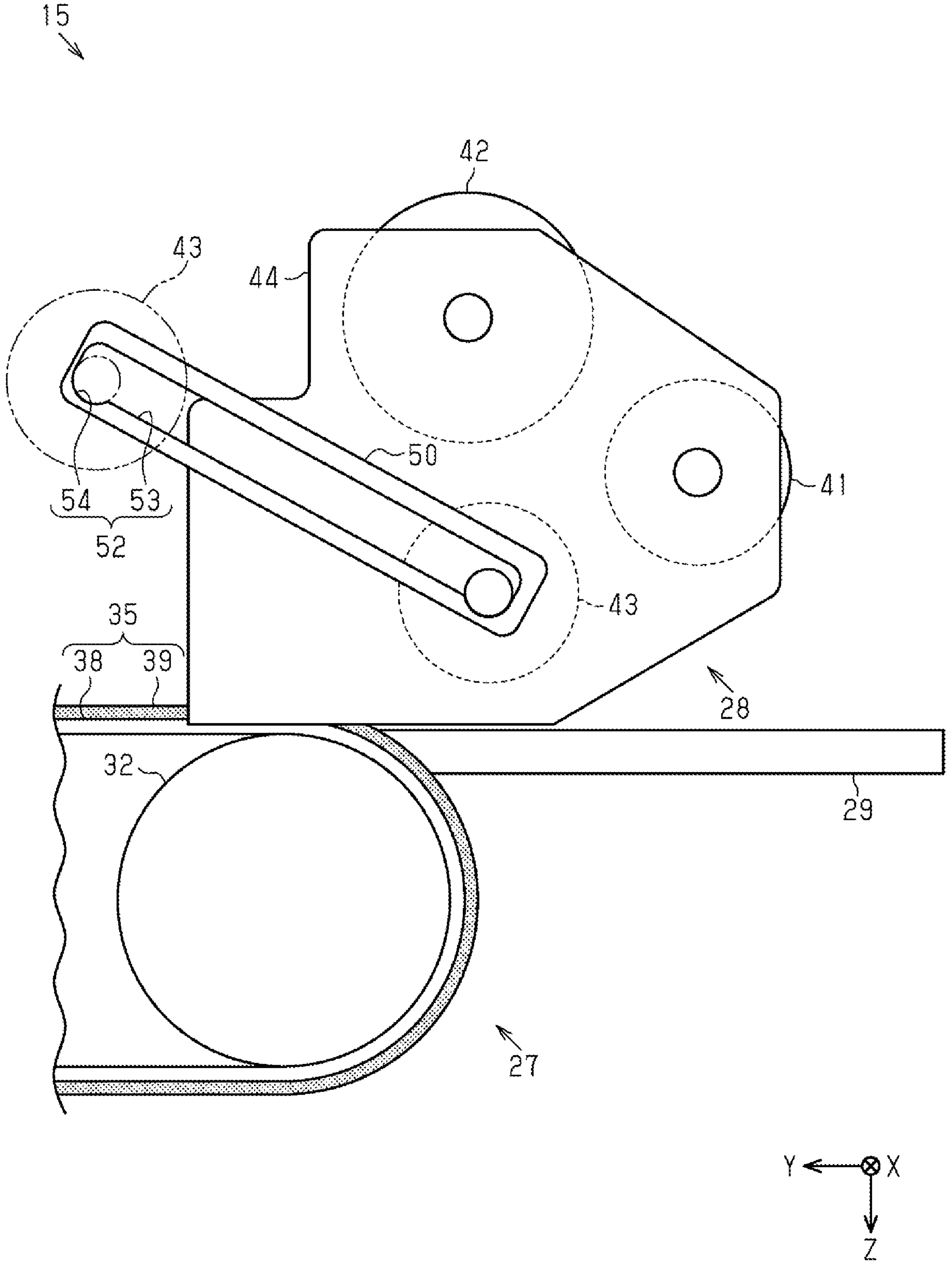
FIG. 9 is a schematic diagram of a sixth variation of the transport device.

As illustrated in FIG. 9, the switching mechanism 52 may switch between a first state in which position change of the third roller 43 is allowed and a second state in which position change of the third roller 43 is restricted. The third roller 43 in a recording position indicated by a dashed line in FIG. 9 or in a set position indicated by a dash-double-dotted line in FIG. 9 is in the second state in which the shaft of the third roller 43 is in the holding hole 54. When the third roller 43 is in a position that is neither the recording position nor the set position, the third roller 43 is in the first state in which the shaft of the third roller 43 is in the guide hole 53.

Seventh Variation

Figure 10:
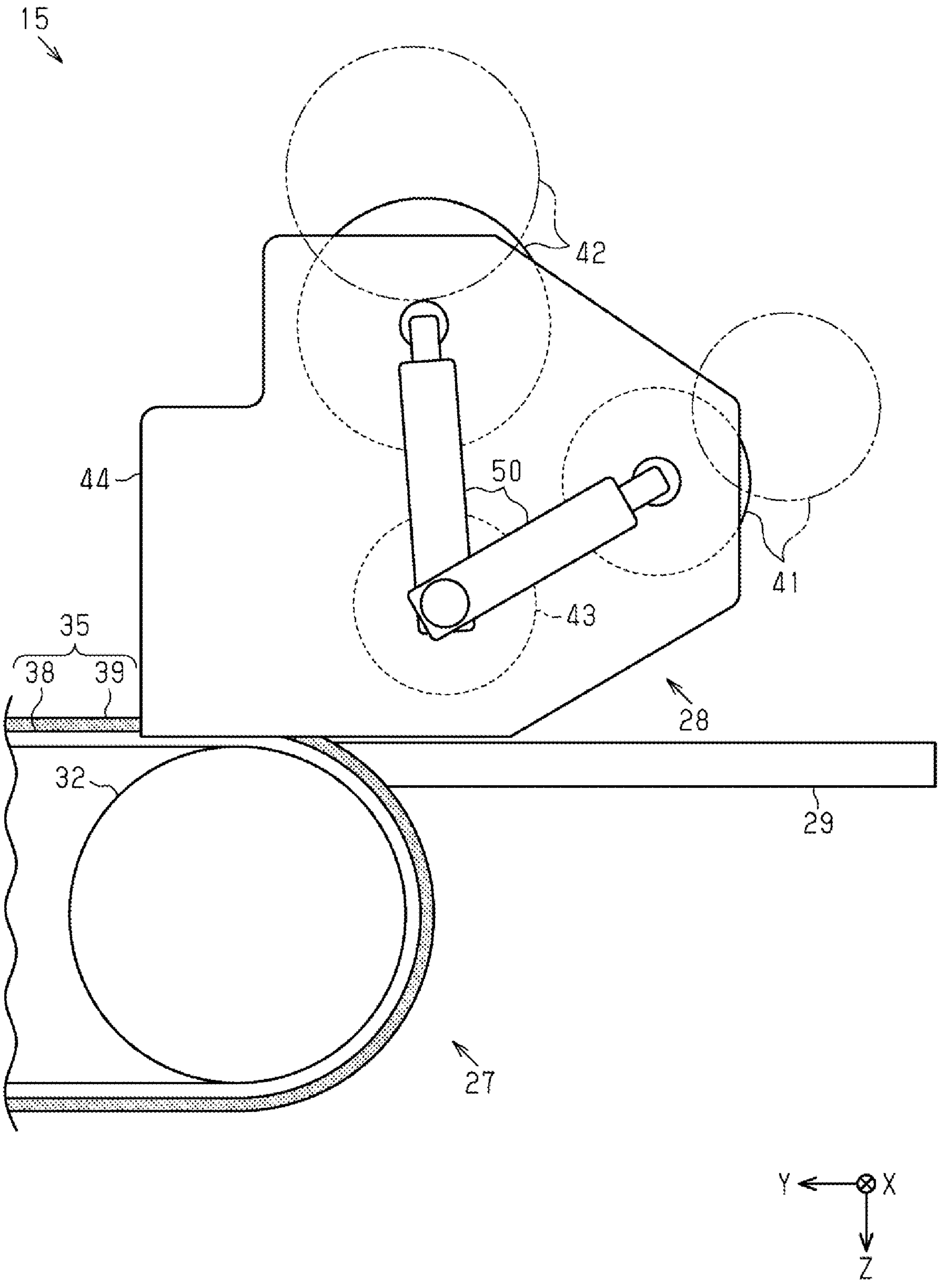
FIG. 10 is a schematic diagram of a seventh variation of the transport device.

As illustrated in FIG. 10, the arm 50 may be composed of a cylinder. The cylinder may be a pneumatic cylinder operated by means of air pressure, or may be a hydraulic cylinder operated by means of hydraulic pressure. The cylinder may function as an interlocking mechanism that interlocks the first roller 41 and the second roller 42 and that changes the positions of the first roller 41 and the second roller 42. The first roller 41 and the second roller 42 may move to a recording position indicated by a dashed line in FIG. 10 or a set position indicated by a dash-double-dotted line in FIG. 10.

Eighth Variation

Figure 11:
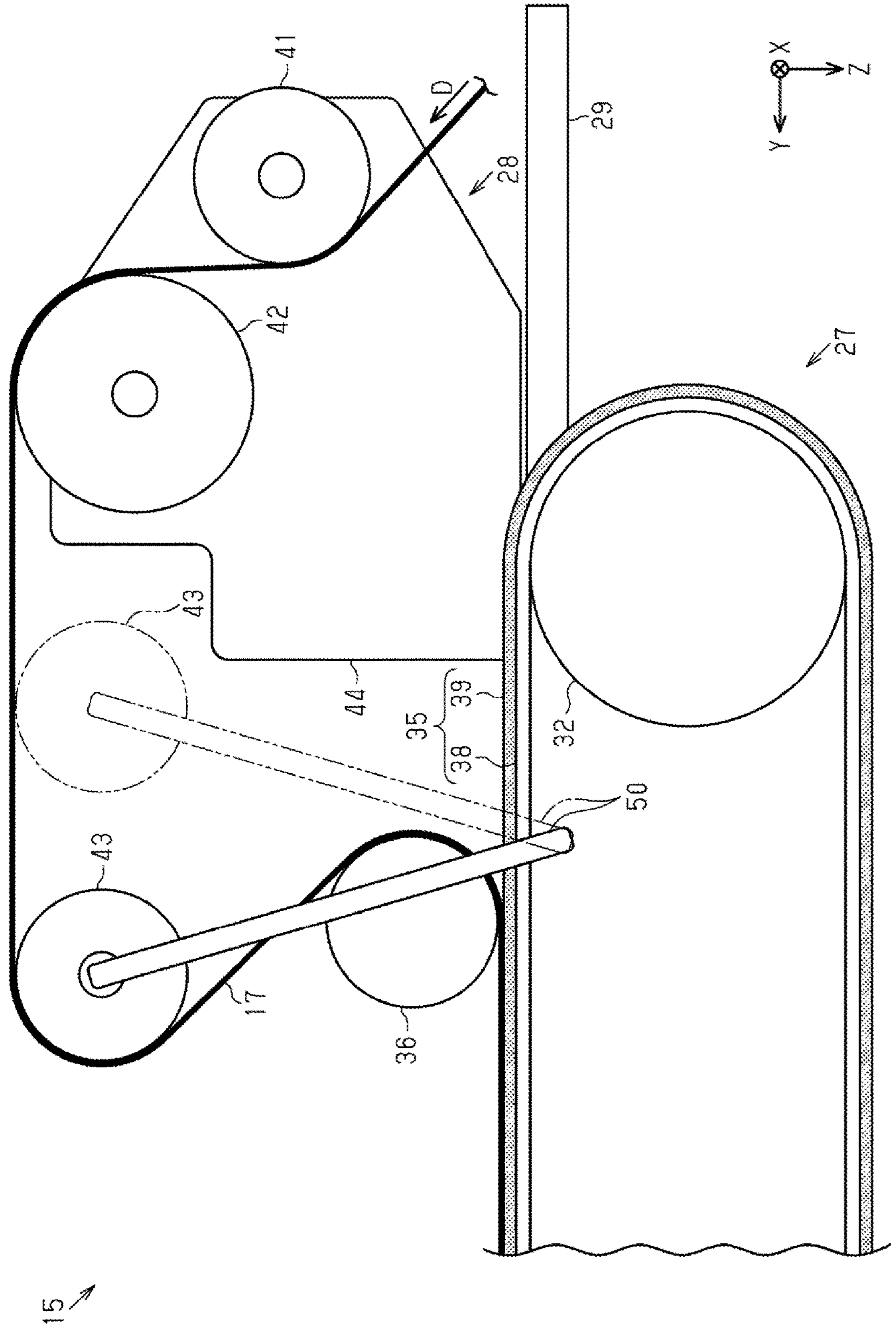
FIG. 11 is a schematic diagram of an eighth variation of the transport device.

As illustrated in FIG. 11, the third roller 43 may be provided at a position different from the position of the support wall 44. The arm 50 may movably support the third roller 43. The third roller 43 may move to a recording position indicated by a solid line in FIG. 11 or a set position indicated by a dash-double-dotted line in FIG. 11. The distance between the third roller 43 in the set position and the pressing portion 36 of the transport unit 27 is greater than the distance between the third roller 43 in the recording position and the pressing portion 36.

Other Variations

- The transport device 15 may include an elastic member such as a spring. For example, in the transport device 15, the entire or a part of the roller unit 28 in the set position may be pulled back to the recording position by a tension spring. For example, in the transport device 15, the entire or a part of the roller unit 28 in the set position may be pushed back to the recording position by a compression spring. The speed limiting mechanism 30 may, by the force of a spring, limit the moving speed of the roller unit 28 returning to a position. The switching mechanism 52 may be, for example, a pin that holds at least one roller that has moved in the post-movement position. The switching mechanism 52 may switch to a second state, in which position change of a roller is restricted, by insertion of the pin, and may switch to a first state, in which position change of a roller is allowed, by removal of the pin.
- The retaining portion 45 may be a clip that clips onto the tip of the medium 17, or may be a hook that is hooked on a hole formed at the tip of the medium 17. The retaining portion 45 may be a magnet. When the retaining portion 45 is a magnet, a part of or the entire third roller 43 may be formed of a material that is magnetic.
- The switching mechanism 52 may be combined with variations, except for the fifth variation and the sixth variation, or the embodiment to the extent technically possible.
- The liquid ejecting device 11 may include a heating unit that heats the medium 17. The heating unit may heat the medium 17 at a position between the roller unit 28 and the position at which recording is performed by the recording unit 14. The support portion 29 may movably support the roller unit 28 relative to the heating unit. The heating unit may be an infrared ray heater, a hot air heater, or the like that heats the medium 17 without contact therewith. The heating unit may be a heat roller that heats the medium 17 by contact therewith. The pressing portion 36 may be composed of a hot air heater, a heat roller, or the like. The pressing portion 36 of the liquid ejecting device 11 may be heated to function as a heating unit, or the liquid ejecting device 11 may include a heating unit that is separate from the pressing portion 36.

The transport device 15 may be provided in a device that is not the liquid ejecting device 11. For example, the transport device 15 may be provided in a recording device that records by fixing a toner to the medium 17.

The liquid ejecting device 11 may be a liquid ejecting device configured to discharge or eject a liquid in addition to an ink. The state of liquid ejected from the liquid ejecting device in the form of micro-sized droplets includes droplets in a granular form, droplets in a teardrop form, and droplets with a string-like tail. The liquid referred to here may be any material as long as it can be ejected from the liquid ejecting device. For example, the liquid may be any substance in its liquid state, and examples include fluids such as liquids with high or low viscosity, sols, gel water, or other inorganic solvents, organic solvents, solutions, liquid resins, liquid metals, or metallic melts. The liquid includes not only a substance in its liquid state, but also, for example, a liquid obtained by dissolving, dispersing, or mixing particles of a functional material formed of a solid material such as a pigment or metallic particles in a solvent. Typical examples of the liquid include an ink and liquid crystal as described in the above embodiment. Here, the ink includes a general aqueous ink, a general oil-based ink, and various other liquid compositions such as a gel ink or a hot-melt ink. Specific examples of the liquid ejecting device include a device for ejecting a liquid containing a dispersed or dissolved material such as an electrode material or a color material used in the production of liquid crystal displays, electroluminescent displays, surface emitting displays, color filters, and the like. The liquid ejecting device may be a device for ejecting a bioorganic substance used in biochip production, a device used as a precision pipette and ejects a liquid sample, a fabric printing device, a micro dispenser, or the like. The liquid ejecting device may be a device for ejecting a pinpoint of lubricant to a precision machine such as a clock or a camera, or a device for ejecting a transparent resin liquid such as a UV curable resin onto a substrate in order to form micro-hemispherical lenses, optical lenses, or the like used in, for example, optical communication elements. The liquid ejecting device may be a device for ejecting an etching solution such as an acid or an alkali for etching a substrate or the like.

Supplementary Note

Hereinafter, technical concepts and effects thereof that are understood from the above-described embodiments and modified examples will be described.

(A) A transport device includes a roller unit having a plurality of rollers around which a medium supplied from a holding unit holding the medium is wound, a transport unit configured to transport the medium passing through the roller unit, and a support portion movably supporting the roller unit relative to the transport unit.

According to this configuration, the roller unit is movable relative to the transport unit. As such, the distance between the roller unit and the transport unit can be changed. Thus, for example, the operator can install the medium while positioning the roller unit away from the transport unit, making it possible to improve the workability of installing the medium.

(B) In the transport device, the roller unit includes a retaining portion, the plurality of rollers are provided along a transport direction in which the transport unit transports the medium, and the retaining portion is configured to retain the medium wound on a roller positioned most downstream in the transport direction among the plurality of rollers.

When the roller unit moves with the medium wound on a plurality of rollers, the medium may be pulled off from the roller unit. The pulling-off of the medium is caused by tension exerted on the medium between the holding unit and the roller unit. In a case in which the medium is pulled off, it is necessary to move the roller unit and then repeat the operation of winding the medium on the plurality of rollers. As such, workability of installing the medium in the roller unit is reduced. In this regard, according to this configuration, the retaining portion is configured to retain the medium wound on the roller positioned most downstream in the transport direction. Thus, when the roller unit moves, the risk that the medium is pulled off from the roller unit can be reduced.

(C) The transport device may include a speed limiting mechanism that limits a moving speed of the roller unit that moves relative to the transport unit.

According to this configuration, the speed limiting mechanism limits the moving speed of the roller unit. Thus, it is possible to reduce the risk of the roller unit moving at a moving speed unintended by the operator.

(D) In the transport device, the roller unit may include an interlocking mechanism that interlocks the plurality of rollers with each other and that changes the positions of the plurality of rollers.

According to this configuration, the interlocking mechanism interlocks the plurality of rollers with each other and changes the positions of the plurality of rollers. Thus, it is more convenient for the operator compared to a case in which the operator changes the positions of the plurality of rollers individually.

(E) In the transport device, the roller unit may include a switching mechanism that switches between a first state in which position change of at least one of the plurality of rollers is allowed and a second state in which position change of the roller is restricted.

According to this configuration, the switching mechanism switches between the first state in which position change of a roller is allowed and a second state in which position change of a roller is restricted. As such, in the first state, the position of a roller can be easily changed. In the second state, the medium can be easily wound on a roller that is restricted from position change.

(F) A liquid ejecting device includes an ejecting unit configured to eject a liquid onto a medium, a roller unit having a plurality of rollers around which the medium supplied from a holding unit holding the medium is wound, a transport unit configured to transport the medium passing through the roller unit, and a support portion movably supporting the roller unit relative to the transport unit.

According to this configuration, the same effect as the transport device described above can be obtained.

What is claimed is:

1. A transport device comprising:

a roller unit having a plurality of rollers around which a medium supplied from a holding unit holding the medium is wound, a transport unit configured to transport the medium passing through the roller unit in a positive medium transport direction, and a support portion movably supporting the roller unit relative to the transport unit, the support portion configured to move the roller unit from a first position where recording occurs on the medium to a second position in a negative medium transport direction, wherein the roller unit includes a retaining portion, the plurality of rollers are provided along a transport direction in which the transport unit transports the medium, and the retaining portion is configured to retain the medium wound on a roller positioned most downstream in the transport direction among the plurality of rollers.

2. The transport device according to claim 1, comprising a speed limiting mechanism that limits a moving speed of the roller unit that moves relative to the transport unit.

3. The transport device according to claim 1, wherein the roller unit includes an interlocking mechanism that interlocks the plurality of rollers with each other and changes positions of the plurality of rollers.

4. The transport device according to claim 3, wherein the roller unit includes a switching mechanism that switches between a first state in which position change of at least one of the plurality of rollers is allowed and a second state in which position change of the roller is restricted.

5. A liquid ejecting device comprising:

an ejecting unit configured to eject a liquid onto a medium, a roller unit having a plurality of rollers around which the medium supplied from a holding unit holding the medium is wound, a transport unit configured to transport the medium passing through the roller unit in a positive medium transport direction, and a support portion movably supporting the roller unit relative to the transport unit, the support portion configured to move the roller unit from a first position where recording occurs on the medium to a second position in a negative medium transport direction, wherein the roller unit includes a retaining portion, the plurality of rollers are provided along a transport direction in which the transport unit transports the medium, and the retaining portion is configured to retain the medium wound on a roller positioned most downstream in the transport direction among the plurality of rollers.

* * * * *